United States Patent [19]

Brown

[11] Patent Number: 5,240,969

[45] Date of Patent: Aug. 31, 1993

[54] LOW-DENSITY RRIM USING MINERAL FIBER FILLER

[75] Inventor: Bari W. Brown, Trenton, Mich.

[73] Assignee: BASF Corporation, Parsippany, N.J.

[21] Appl. No.: 17,913

[22] Filed: Feb. 16, 1993

Related U.S. Application Data

[62] Division of Ser. No. 914,080, Jul. 16, 1992, Pat. No. 5,208,269.

[51] Int. Cl.$^5$ ............................ C08G 18/00; C08J 9/00
[52] U.S. Cl. .................................... 521/125; 521/164; 521/170
[58] Field of Search ...................... 521/125, 164, 170

[56] References Cited

U.S. PATENT DOCUMENTS

| | | | |
|---|---|---|---|
| 4,226,944 | 10/1980 | Stone et al. ......................... | 521/125 |
| 4,582,887 | 4/1986 | Dominguez et al. ................ | 521/110 |
| 4,758,604 | 7/1988 | Barron ................................. | 521/163 |
| 4,800,103 | 1/1989 | Jeffs ..................................... | 523/205 |
| 4,871,789 | 10/1989 | Martinez ............................. | 523/220 |
| 4,938,825 | 7/1990 | MacDonald ........................ | 156/245 |
| 4,943,603 | 7/1990 | Martinez ............................. | 523/220 |
| 4,999,383 | 3/1991 | Blount ................................. | 521/125 |
| 5,036,118 | 7/1991 | Martinez ............................. | 523/212 |
| 5,071,613 | 12/1991 | Furami et al. ...................... | 264/257 |
| 5,077,330 | 12/1991 | Ehrhart et al. ..................... | 521/125 |
| 5,096,644 | 3/1992 | Endo et al. ......................... | 264/137 |

FOREIGN PATENT DOCUMENTS

0464886A2  1/1992  European Pat. Off. .
2083484    3/1982  United Kingdom .

Primary Examiner—Morton Foelak
Attorney, Agent, or Firm—Dennis V. Carmen

[57] ABSTRACT

The invention pertains to a low weight, low density rigid polyurethane-polyurea reinforced reaction injection molded (RRIM) part having wollastonite reinforcing fibers dispersed throughout a matrix made by reacting polyisocyanates with a resin containing hydroxy group tertiary amine polyether polyols, a water as a blowing agent, and optionally surfactants, chain extenders, and urethane promoting catalysts. The low density RRIM part using wollastonite and the tertiary amine polyether polyols is a low cost alternative to glass fiber reinforced low density parts, and the part exhibits good mechanical properties and quick demold times.

12 Claims, No Drawings

LOW-DENSITY RRIM USING MINERAL FIBER FILLER

This is a division of application Ser. No. 07/914,080 filed Jul. 16, 1992, U.S. Pat. No. 5,208,269.

FIELD OF THE INVENTION

The subject invention relates to the field of fiber-reinforced reaction injection moldings. More particularly, the subject invention pertains to reactive systems containing hydroxyl functional tertiary amine polyols, preferably without the presence of chain extenders, as the matrix for wollastonite fiber-reinforced water-blown moldings useful as interior door panels, overhead and center consoles, package trays, and instrument panel substrates.

DESCRIPTION OF THE RELATED ART

Reaction-injection-molding (RIM) systems by now are well known to those skilled in the art. Commercial systems produce elastomeric products containing polyurethanepolyurea linkages which have many uses, for example, as automobile facias. However, such systems have relatively low heat distortion temperatures and lack the flexural modulus and tensile strength necessary for many applications. The chemistry of these reactive systems involves the use of a polyisocyanate "A side" (A component) and a "B side" employing a mixture of compounds containing isocyanate-reactive hydrogens. These "B side" components generally include one or more hydroxyl-functional polyether or polyester polyols and one or more sterically hindered diamines. The polyol components react with the isocyanate to form urethane linkages while the amine components react to form urea linkages. Such systems are disclosed, for example, in Weber U.S. Pat. No. 4,218,543.

To improve the flex modulus and tensile strength of RIM parts, woven or non-woven fiber reinforcement glass mats have been used. Such mats are cut into the shape of the molding and laid up on a mold surface. The physical handling of the mats is often irritating to the skin, difficult to handle, and requires time to cut and lay into the mold.

Other methods of improving the flexural modulus and tensile strength of RIM parts is to mix short, chopped fibers into the resin B side component and inject the fiber-containing resin with isocyanate into the mold (RRIM). This process is also well known and has been proposed as a means for the manufacture of high density parts requiring strength in applications such as exterior automotive body parts. Various types of fillers, such as mica, glass, and wollastonite have been proposed as reinforcing agents in high density RRIM. For example, U.S. Pat. Nos. 5,036,118, 4,943,603, and 4,871,789 describe the use of mica or wollastonite as reinforcement predominately in high density ($>1.0$ specific gravity) RRIM systems, suitable for use in exterior body panels.

More recently, the use of RRIM for interior automotive parts has been investigated. In the wake of ever increasing standards for increasing fuel efficiency, the industry is continuously seeking means to reduce the weight of automotive parts while maintaining its necessary functional strength. Accordingly, for interior body parts where flexural modulus, tensile strength, and impact resistance requirements are not as stringent as in exterior body panels, low density RRIM parts have been investigated as alternatives to heavier weight metal, wood fiber, ABS and PP interior parts. Glass reinforcement in low density RRIM has been proposed. However, such reinforcement is relatively expensive.

As part of the subject invention, the inventor has discovered that when combined with a particular matrix resin, wollastonite is an excellent alternative for glass fiber reinforcement in low density RRIM, at approximately one-third to one-half the cost of glass. It has also been found that using hydroxyl functional tertiary amine polyether polyols, one can produce a RRIM part having good flexural modulus, tensile strength, and impact resistance. Such a polyol also reduces the demold time and, in one embodiment, reduces the viscosity of the resin for greater ease in processing, does not require the use of chain extenders/crosslinkers, and requires reduced amounts of urethane forming catalysts.

SUMMARY OF THE INVENTION

The subject invention relates to low weight, low density rigid polyurethane-polyurea RRIM parts employing wollastonite reinforcing fibers dispersed through a matrix comprising the reaction product of an isocyanate component and a resin component containing hydroxyl group tertiary amine polyether polyols, blowing agent, preferably consisting of water, and optionally a urethane-promoting catalyst, chain extender, and a surfactant.

DETAILED DESCRIPTION OF THE INVENTION

The reinforcing filler of the subject invention is an acicular wollastonite preferably having an aspect ratio of greater than 2, more preferably 10 or greater, to improve the flexural modulus and tensile strength. The wollastonite preferably has an average particle length ranging from 0.005 inch to 1 inch, more preferably from 0.03 to 0.25 inch, with one-sixteenth inch milled or chopped fibers being the most preferred.

The wollastonite particles are preferably surface treated to improve adhesion between the particle and the polymer matrix. The surface treatment employed may be a coating treatment applied to the surface of the particle as a chemical modification to the filler. Surface treating agents and methods are well known to those of skill in the art and include aminoalkyl, chloro, epoxy, vinyl, and/or isocyanate silane coupling agents as disclosed in U.S. Pat. Nos. 5,096,644, 4,582,887, 4,374,210, 4,444,910, 4,218,510, 4,296,945, 4,689,356, and 4,585,803, all hereby incorporated by reference; latex compositions as disclosed in U.S. Pat. No. 4,800,103 to Jiffs, hereby incorporated by reference; and titanate coupling agents as disclosed in *Adhesion and Bonding in Composites*, Ryutoko Yosomiya et al., Marchel Dekker, Inc., New York 1990, pp. 110–154, hereby incorporated by reference. Preferred are the epoxy, chloro, isocyanate, and amino silane coupling agents.

Suitable amounts of wollastonite dispersed throughout the part range from 10 weight percent to 20 weight percent based on the weight of the total composition, preferably from 13 weight percent to 17 weight percent; or from about 20 weight percent to about 30 weight percent based on the weight of the B side resin component, with from about 25 weight percent to 30 weight percent being preferred. One may add less than the stated amounts of reinforcement; however, much of the desired strength is lost as the composite approaches the properties of an unreinforced part. The stated upper limits may also be exceeded; however, while the flexural modulus will increase, the elongation and impact resistance decreases producing a brittle part. Thus, adding the stated range of reinforcement produces a part with optimal overall mechanical properties.

The wollastonite reinforcement may optionally be admixed with other chopped fibers or fillers in the polyol side or added to the isocyanate side in amounts such that the total fiber and filler reinforcement in the composite does not appreciably degrade the physical properties of a comparable composite containing solely wollastonite in amounts of 30 weight percent or less. It is desirable to add about 50 weight percent or less /f the other fibers or fillers such that the physical properties and expense of the part are predominately determined by wollastonite reinforcement.

Suitable additional fibers include man-made glass fibers, carbon fiber, silicon carbide fiber, metal fibers, ceramics and the like, and natural reinforcement such as flaked mica, jute, and cellulose fibers. Fillers include flaked or milled glass, carbon black, talc, mica, calcium carbonate, bauxite, and the like.

The composite of the subject invention is a low density part possessing high flexural modulus while maintaining its impact strength. The density of the composites have a specific gravity of 1.0 or less, preferably from 0.4 to 0.65. The flexural modulus of the composite is greater than about 50,000 psi at 72° F., preferably greater than 100,000 psi, more preferably greater than 125,000 psi at 72° F. The impact strength of the composite has a Gardner impact strength of at least 0.4 ft./lb. at 72° F., preferably 0.5 ft./lb. or more, more preferably 0.8 ft./lb. or more. The heat distortion temperature of the composite is greater than 120° F., preferably 130° F. or greater at 264 psi.

The reactive components of the subject invention RRIM systems comprise one or more polyisocyanates and an isocyanate-reactive resin component comprising a hydroxyl-functional tertiary amine polyether polyol. In the low density (cellular) RRIM systems of the invention, the isocyanate-reactive component may further contain up to about 50 weight percent based on the B side resin component of a conventional or graft polyol and/or low molecular weight chain extender. Traditional polyurethane-polyisocyanurate system components such as flame retardants, catalysts, UV stabilizers, surfactants, dyes, and pigments may also be added when necessary or desirable.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 2,2'-, 2,4'-, and 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate; and polymericpolyisocyanates such as polymethylene polyphenylene polyisocyanate. Especially useful due to their availability and properties are 4,4'-diphenylmethane diisocyanate and polymethylene polyphenylene polyisocyanate.

Crude polyisocyanates may also be used in the compositions of the present invention, such as crude diphenylmethane isocyanate obtained by the phosgenation of crude diphenylmethane diamine. The preferred or crude isocyanates are disclosed in U.S. Pat. No. 3,215,652.

Also useful are the modified polyisocyanates, examples of which include uretoniminecarbodiimide group containing polyisocyanates (German patent No. 10 92 007), allophanate group containing polyisocyanates (British Patent No. 994,890; Belgium Patent No. 761,626), isocyanurate group containing polyisocyanates (German Patent Nos. 10 22 789, 12 22 067, 10 27 394, German Published Application Nos. 19 29 034 and 20 04 048), urethane group containing polyisocyanates (Belgium Patent No. 752,261, U.S. Pat. No. 3,394,164), biuret group containing polyisocyanates (German Patent No. 11 01 394, British Patent No. 889,050) and ester group containing polyisocyanates (British Patent No.s 965,474, 1,072,956, U.S. Pat. No. 3,567,763, German Patent No. 12 31 688), all of which are hereby incorporated by reference.

Preferably used are the easily accessible, optionally uretonimine-carbodiimide and urethane group-containing, aromatic di- and polyisocyanates such as 2,2'-, 2,4'-, 4,4'-diphenylmethane diisocyanate (MDI), as well as any desired mixtures of these isomers, and mixtures of 2,2'-, 2,4'-, 4,4'-diphenylmethane diisocyanate and polyphenyl polymethylene polyisocyanates (crude MDI). Preferably used is a uretonimine-carbodiimide-modified 4,4'-MDI composition containing from 10 weight percent to 40 weight percent modified MDI and 60 weight percent to 90 weight percent 4,4'-MDI, optionally containing less than 10 weight percent 2,2'- and 2,4'-MDI, the weight percentages based on the weight of the uretonimine-carbodiimide-modified 4,4'-MDI composition. The weight ratio of uretonimine to carbodiimide ranges from 20:1 to 1:1.

Quasi-prepolymers are also preferred, such as urethane-modified MDI obtained by reacting a low molecular weight (<400) polyhydric compound with 4,4'-MDI, the final product containing, for example, from 40 weight percent to 60 weight percent urethane prepolymer and 40 weight percent to 60 weight percent 4,4'-MDI.

Other such modifications include forming a quasi-prepolymer by reacting a uretonimine-carbodiimide-modified, allophanate-modified, or biuret-modified MDI with a low or high molecular weight polyhydric compound.

The above-mentioned isocyanates may be used singly or as blends with other isocyanates to obtain the desired physical properties, viscosity, and freezing point. For example, crude MDI may be admixed with 4,4'-MDI and 2,4'-MDI; or one may blend the uretonimine-carbodiimide-modified MDI with a urethane-modified MDI and /ptionally crude MDI. Such blends may then, if desired, be reacted with a polyhydric compound to obtain a quasi-prepolymer.

The B side resin component contains a hydroxyl functional tertiary amine polyether polyol prepared by oxyalkylating an aliphatic or aromatic amine with ethylene oxide, propylene oxide, or mixtures thereof.

Examples of suitable aromatic amines which are useful as initiators include the various phenylenediamines, toluenediamines, and diphenylmethanediamines. Examples of suitable aliphatic amines include ethylenediamine, propylenediamine, 1,4-butanediamine, 1,6-hexanediamine, diethylenetriamine, triethylenetetraamine, and the like. Hydroxylalkylamines may also be useful, for example, 2-hydroxyethylamine and 2- and 3-hydroxypropylamine, bis(2-hydroxyethyl)ethylamine, tris(2-hydroxyethyl)amine and the like. The preferred initiators are monoethanolamine, ethylenediamine, 2-hydroxylpropylamine, and bis(2-hydroxyethyl)-2-hydroxypropylamine.

The amine or hydroxyalkylamine initiators are oxyalkylated with sufficient alkylene oxide to convert at least one and preferably all amino groups to tertiary amino groups. Alkylene oxides may be mentioned such as ethylene oxide and propylene oxide. Mixtures of these alkylene oxides may be used; or they or their mixtures may be used sequentially to form homopolymeric, block, heteric, or block-heteric polyether polyols. The process of preparation of such polyether polyols is conventional and is well known to those skilled in the art.

Preferred hydroxyl functional tertiary amine polyether polyols are polyoxypropylated-polyoxyethylated monoethanolamines containing a primary hydroxyl group cap, such as polyoxyethylene, from 5 weight percent to 35 weight percent, preferably from 20 weight percent to 30 weight percent. Additional preferred hydroxyl functional tertiary amine polyether polyols are polyoxypropylated-polyoxyethylated ethylenediamines capped with polyoxyethylene groups in an amount from 5 weight percent to 35 weight percent, preferably 10 weight percent to 20 weight percent. Mixtures of these two polyols are also suitable, preferably in weight ratios of the monoethanolamine initiated polyether polyol to the ethylenediamine initiated polyether polyol from 9:1 to 2:1 where no other polyol is admixed.

The B side resin component preferably contains from about 10 weight percent, more preferably 20 weight percent to 100 weight percent of hydroxyl group tertiary amine polyether polyol based on the weight of all polyether polyols in the resin. Suitable amounts of the tertiary amine polyether polyol contained in the resin component range from 10 weight percent to 99 weight percent, preferably 20 to 99 weight percent, more preferably 50 to 99 weight percent, based on the weight of all reactive compounds in the B side resin component. Reactive compounds include all ingredients except wollastonite fibers and other optional room temperature insoluble fillers and fibers. In a more preferable embodiment of the invention, all (100 weight percent) polyether polyols in the resin consist of tertiary amine polyether polyols terminated with primary hydroxyl groups; and the resin is devoid of any chain extenders or crosslinkers.

The average functionality of the hydroxyl functional tertiary amine polyether polyols is from about 2.5 to 6, preferably about 2.8 to about 4.0, with average equivalent weights being from about 50 to about 3,000. Polyols with lower functionalities and higher molecular weights tend to make the low density foam more flexible and increases its impact strength at the expense of flexural modulus. A lower molecular weight, high functionality polyol will increase the crosslinking density and the flexural modulus of the foam. It has been found that one may advantageously achieve a high flexural modulus by using high functionality polyols and maintain the impact strength of the foam by blending a low molecular weight polyol with a high molecular weight polyol. Thus, in one preferred embodiment, a low molecular weight tri-functional polyol is blended with a high molecular weight tertiary functional polyol to obtain a foam possessing good flexural modulus while maintaining a satisfactory impact strength.

One may blend in major or minor quantities polymer modified polyether polyols with the hydroxyl functional tertiary amine polyether polyols. One of such polymer modified polyether polyols is known as graft polyols. Graft polyols are well known to the art and are prepared by the in situ polymerization of one or more vinyl monomers, preferably acrylonitrile and styrene, in the presence of a polyol ether or polyester polyol, particularly polyols containing a minor amount of natural or induced unsaturation. Methods of preparing such graft polyols may be found in columns 1-5 and in the Examples of U.S. Pat. No. 3,652,639; in columns 1-6 and the Examples of U.S. Pat. No. 3,823,201; particularly in columns 2-8 and the Examples of U.S. Pat. No. 4,690,956; and in U.S. Pat. No. 4,524,147; all of which patents are herein incorporated by reference. The use of graft polyols may increase the flexural modulus and tensile strength of the foam.

Non-graft polymer modified polyols are also suitable, for example, those prepared by the reaction of a polyisocyanate with an alkanolamine in the presence of a polyol as taught by U.S. Pat. Nos. 4,293,470; 4,296,213; and 4,374,209; dispersion of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

Also useful in minor amounts are amine initiated polyether polyols which have free amino hydrogens and hydroxyl-functional polyoxyalkylene moieties, blended with the tertiary amine polyol. Such polyols are prepared as taught by U.S. Pat. No. 4,517,383, by oxyalkylating an aliphatic or aromatic amine with a stoichiometric excess of alkylene oxide, but utilizing an extraordinarily high amount of basic oxyalkylation catalyst which must be present at the onset of oxyalkylation. Such dual-functionality asymmetric polyols create both urethane and urea linkages in the finished product, and further have the advantage of lower viscosities than their fully oxylated, symmetrical analogues.

To promote fast demold times, it is preferable that at least one of the polyether polyols, more preferably all of the polyether polyols, be terminated with primary hydroxyl groups rather than secondary hydroxyl groups.

Hydroxyl-functional and amine-functional chain extenders are optional and include hydroxyl-functional chain extenders such as ethylene glycol, glycerine, trimethylolpropane, 1,4-butanediol, propylene glycol, dipropylene glycol, 1,6-hexanediol, and the like; and amine-functional chain extenders such as the sterically hinder diethyltoluene diamine and the other hindered amines disclosed in Weber U.S. Pat. No. 4,218,543: phenylene diamine, 1,4-cyclohexane-bis-(methylamine), ethylenediamine, diethylenetriamine, N-(2-hydroxypropyl)-ethylenediamine, N,N'-di(2-hydroxypropyl)ethylenediamine, piperazine, and 2-methylpiperazine. In low density RRIM systems, the amount of chain extender is generally less than 30 weight percent based on the total weight of the resin component, preferably less than 25 weight percent, more preferably no chain extender being present. In resin components exclusively containing hydroxyl functional tertiary amine polyols, chain extenders are not necessary.

Plasticizers may also optionally be used in the subject invention low density RRIM systems. In low density RRIM, the amount of plasticizer is generally less than 25 weight percent of the total resin (B-side) component.

Mold releases, both external and internal, may be utilized. Internal mold releases are generally mixtures of long chain carboxylate salts, particularly ammonium and substituted ammonium stearates, and calcium and zinc stearates. External mold releases are well-known commercial products and include waxes and silicones.

In the low density RRIM systems of the invention, a blowing agent is necessary. Water is the preferred blowing agent and may be used in amounts of up to about 4 weight percent, preferably less than 1.0 weight percent, more preferably less than 0.5 weight percent, of the resin (B-side) component. The density of the foam decreases with increasing water content. When water is used as the blowing agent, the polyisocyanate component is increased proportionately. Calculating the amount of water required and isocyanate required are routinely performed by those skilled in the arts of polyurethane and polyisocyanurate foams.

Chlorofluorocarbons (CFCs) and other volatile organic compounds may also be used as blowing agents, either alone, or in conjunction with water. When used alone, CFC blowing agents and other halogenated organics such as methylene chloride are generally used in amounts up to about 30 weight percent of the polyol component, preferably from 15 to about 25 weight percent. Other volatile organic compounds such as pentane, isopentane, acetone, and the like, are used in correspondingly lesser amounts due to their lower molecular weights. When co-blown, the CFC-type blowing agents are utilized in lesser amounts, for example, up to about 20 weight percent of the polyol component. Preferable are the HCFCs having an ozone depletion potential of 0.05 or less. Other reactive blowing agents may be used in conjunction with water, such as tertiary alcohols and formic acid.

Flame retardants may also be used when required by the formulation. Suitable flame retardants are well known to those skilled in the art; but the low molecular weight halogenated phosphate esters, polyhalogenated biphenyls, biphenyloxides, and the like may be used when flame retardants are necessary. As the presence of such flame retardants generally causes a decrease in physical properties, use of flame retardants is not preferred.

Ultraviolet stabilizers and absorbers may also be useful. Such stabilizers generally act by absorbing ultraviolet radiation. Many such ultraviolet absorbers are commercially available, such as the Uvinul® absorbers manufactured by BASF Corporation, Parisippany, NJ.

Suitable catalysts include both urethane and isocyanurate reaction promoting catalysts and are well known to those skilled in the art of polyurethanes. Suitable polyurethane-promoting catalysts include tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropylpropylenediamine, 3-diethylaminopropyldiethylamine, dimethylbenzylamine, and the like. Preferred catalysts are amine catalysts such as those commercial available from Air Products Chemical Company under the name of DABCO® 33-LV. Other suitable catalysts are, for example, stannous chloride, dibutyltin di-2-ethyl hexanoate, stannous oxide, dibutyltin diacetate, dibutyltindilaurate, as well as other organometallic compounds such as are disclosed in U.S. Pat. No. 2,846,408. Suitable amounts of urethane catalyst are 1 weight percent of the resin component, preferably less than 0.3 weight percent.

Isocyanurate promoting catalysts include potassium acetate and potassium 2-ethylhexanoate, with potassium acetate being advantageously mixed as a solution in a glycol such as ethylene glycol.

A surface-active agent is also optional but may be used for production of high grade polyurethane foam especially when polyols other than the tertiary amine polyols are employed. Surfactants prevent the foam from collapsing and promote fine uniform cell structures. Numerous surface-active agents have been found satisfactory. Nonionic surface-active agents are preferred. Of these, the nonionic surface-active agents such as the 7ell-known silicones have been found particularly desirable. Other surface-active agents include polyethylene glycol ethers of long chain alcohols, tertiary amine or alkanolamine salts of long chain alkyl acid sulfate esters, alkyl sulfonic esters, and alkyl arylsulfonic acids. Preferred surfactants are DC190 and DC193, silicon-containing surfactants available from Dow-Corning, Midland, Mich.

The flexural modulus, heat distortion temperature, and rigidity of the matrix may be adjusted by varying the urethane/isocyanurate content of the product. The isocyanurate content is increased by increasing the ratio of isocyanate (A side) to polyol (B side). In general, isocyanate indices of from 80 to about 700 are useful, preferably from 95 to about 250, and most preferably from 95 to 120.

Methods of manufacturing RRIM moldings are well known in the art. The resin components are mixed and maintained at tank temperatures from 75° F. to 95° F., preferably from 85° F. to 95° F. to reduce the viscosity of the resin. The resin component and the isocyanate component are impingement mixed at pressures around 2,000 psi and injected at about atmospheric pressure into an open mold which is subsequently shut and clamped or at about 150-200 psi into a closed mold. The mold is preheated at from 100° F. to 180° F., preferably from 130° F. to 150° F., more preferably around 140° F., and may contain a substrate such as vinyl laid up on one of the mold surfaces. The raw material is usually center injected, after which the part is demolded after a period of typically one-and-a-half (1½) to four (4) minutes. By using the tertiary amine polyols of the present invention, especially a predominant amount of the monoethanolamine initiated tertiary amine polyol of the invention, the reaction time is much quicker, reducing the cure and demold time to 60 seconds or less.

The following examples illustrate the nature of the invention and are not intended to be limiting thereof. Unless otherwise stated, all formulation values are given in weight percent.

Polyol A is a graft polyol containing 30 eight percent 1:1 acrylonitrile styrene solids suspended in a propylene oxide-ethylene oxide adduct of trimethylolpropane having a 13 weight percent ethylene oxide cap, the graft polyol having a nominal hydroxyl number of about 24.

Polyol B is a tertiary amine polyether polyol comprising a propylene oxide-ethylene oxide adduct of ethylenediamine terminated with about 15 weight percent ethylene oxide and having a nominal hydroxyl number of 62.

Polyol C is a tertiary amine polyether polyol comprising a propylene oxide-ethylene oxide adduct of monoethanolamine terminated with about 26 weight percent ethylene oxide and containing about 55 weight percent polyoxypropylene, having a nominal hydroxyl number of 500.

1,4-Butanediol is a chain extender.

DC-193 is an industry standard silicone surfactant commercially available from Air Products Corp.

T-12 is dibutyltin dilaurate acting to promote cure, commercially available from Air Products Corp.

I-460 is a 75/25 weight percent blend of butanediol and triethylenediamine, respectively.

POLYCAT 46 is a 62/38 weight percent blend of glycol and potassium acetate, respectively, available from Air Products Corp.

DABCO 33-LV is a 33/67 weight percent blend of TEDA and DP6, respectively, available from Air Products Corp.

Isocyanate A is a blend of isocyanates comprising about 60 weight percent 4,4'-diphenylmethane diisocyanate, 5 weight percent 2,4'-diphenylmethane diisocyanate, and 35 weight percent three-ringed or higher oligomeric polymethylene polyphenylene polyisocyanates.

Isocyanate B is a 25 weight percent uretonimine-carbodiimide-modified 4,4'-diphenylmethane diisocyanate and 75 weight percent 4,4'-diphenylmethane diisocyanate.

Isocyanate C is a 50 weight percent glycol initiated urethane-modified prepolymer in 4,4'-diphenylmethane diisocyanate.

Isocyanate D is a 50/50 weight percent blend of Isocyanate B and Isocyanate C.

Isocyanate E is polymethylene polyphenylene polyisocyanate.

Filler A is a wollastonite fiber, an acicular calcium metasilicate commercially available from NYCO Corp. under the name of G-RRIM TM Wollastokup ® having a 15:1 aspect ratio.

Filler B is one-sixteenth inch milled glass.

RESIN COMPONENT 1

Resin 1 is a blend made by the sequential addition of 35.9 weight percent Polyol A; 14.55 weight percent of Polyol B; 20.36 weight percent of 1,4-butanediol; 0.73 weight percent of DC-193; 0.88 weight percent of I-460; 0.08 weight percent of T-12; 0.40 weight percent of water; and 27.10 weight percent of Filler A, each ingredient being mixed for 60 seconds using a 3" German stirrer at 1700–3000 rpm.

RESIN COMPONENT 2

Using the same procedure as in Resin 1, 63.84 weight percent of Polyol C; 7.0 weight percent of Polyol B; 0.75 weight percent of POLYCAT 46; 0.1 weight percent of DABCO 33-LV; 0.3 weight percent of water; 0.1 weight percent of T-5; and 28 weight percent of Filler A were blended.

RESIN COMPONENT 3

Resin 3 is identical to Resin 2 except that Filler A was replaced with Filler B.

EXPERIMENT

The resins and isocyanates were combined in the proportions designated below in Table I. Samples 1–4 were prepared by adding the isocyanate to the resin batch and handmixing using a drill press with a three inch blade at 2340 rpm for 5 seconds and pouring the mixture into an aluminum 10"×10"×1/16" mold preheated to about 140° F. and sprayed with a silicone release agent. The mold was clamped shut, and the material allowed to react. The plaques were demolded and tested, the results of which are reported in Table I.

Samples 5–6 were prepared using an Cannon and an EMB high pressure impingement mixing machine, respectively, to inject the raw materials at about 85° F. into a closed mold preheated to about 140° F. The mold contained a vinyl backing lain in the female half, and about 1600 grams of material was injected through the top half of the mold. The molded door panel was demolded in 60 seconds and tested for its properties, also reported in Table I.

TABLE I

| SAMPLE | 1 | 2 | 3 | 4 | 5 | 6 |
|---|---|---|---|---|---|---|
| ISOCYANATE A | — | — | — | — | 83 | 83 |
| ISOCYANATE B | 77.5 | — | — | — | — | — |
| ISOCYANATE C | — | — | 99 | — | — | — |
| ISOCYANATE D | — | — | — | 87 | — | — |
| ISOCYANATE E | — | 72.6 | — | — | — | — |
| RESIN 1 | 100 | 100 | 100 | 100 | — | — |
| RESIN 2 | — | — | — | — | 100 | — |
| RESIN 3 | — | — | — | — | — | 100 |
| INDEX | 100 | 100 | 100 | 100 | 100 | 100 |
| SPECIFIC GRAVITY | .58 | .58 | .54 | .50 | .65 | .625 |
| THICKNESS | .14 | .14 | .14 | .14 | .1 | .14 |
| FLEXURAL MODULUS AT | | | | | | |
| 72° F. | 127,500 | 64,000 | 52,000 | 52,000 | 175,000 | 195,000 |
| −20° F. | — | 120,000 | 120,000 | 110,000 | — | — |
| 158° F. | — | 27,000 | 4,500 | 14,000 | — | — |
| TENSILE (PSI) | 1,900 | 1,400 | 1,600 | 1,400 | 2,100 | 1,740 |
| HARDNESS, SHORE A | — | 94 | 95 | 94 | — | — |
| ELONGATION (%) | 5 | 5 | 9 | 7 | 3.0 | 3.5 |
| HDT (264 PSI) °F. | 130 | 120 | 112 | 114 | 140 | 140 |
| CLTE % (24 HR.) | 0.75 | 42 × 10$^{-6}$ | 61 × 10$^{-6}$ | 49 × 10$^{-6}$ | 21 × 10$^{-6}$ | 21 × 20$^{-6}$ |
| GARDNER IMPACT (IN./LB.) | | | | | | |
| 72° F. | 12 | 6 | 8 | 10 | 6 | 6 |
| −20° F. | 8 | 4 | 2 | 6 | 8 | 8 |

TABLE I-continued

| SAMPLE | 1 | 2 | 3 | 4 | 5 | 6 |
|---|---|---|---|---|---|---|
| DEMOLD TIME (SECONDS) | 150 | 150 | 150 | 150 | 60 | 60 |

Sample 6 containing glass fiber reinforcement demolded in 60 seconds and had good flexural modulus and impact strength for a low density RRIM part prepared with a tertiary amine polyol. The results from Sample 5 indicate that wollastonite is a low cost alternative to glass fiber reinforcement when one employs a predominant amount of tertiary amine polyol. The wollastonite reinforced part made with the tertiary amine polyol had comparable mechanical properties to the glass reinforced part. Samples 1-4 also exhibited suitable, although not preferable, properties when minor portions of tertiary amine polyol were employed in a wollastonite-filled part. However, Sample 1 demonstrated good overall properties when uretonimine-carbodiimide-modified MDI is used as the isocyanate in the preparation of the matrix.

We claim:

1. A rigid cellular polyurethane reinforced RIM composite with a specific gravity of less than 1.0, having wollastonite fibers dispersed throughout a matrix, said matrix comprising:
    A) an "A side" isocyanate component comprising one or more polyisocyanates, reacted with,
    B) a "B side" component comprising a polyoxyalkylene polyether polyol composition comprising hydroxyl functional tertiary amine polyether polyols prepared by oxyalkylating an amine with ethylene oxide, propylene oxide, tetrahydrofuran, or mixtures thereof, a blowing agent comprising water, a polyurethane/isocyanurate-promoting catalyst, and optionally a chain extender, a surfactant, and stabilizers.

2. The composite of claim 1, wherein the specific gravity is 0.8 g/cm³ or less.

3. The composite of claim 2, wherein the wollastonite fibers are contained in the "B side" component prior to reaction with the "A side" component.

4. The composite of claim 3, wherein all the polyols contained in the "B side" component consist of hydroxyl functional tertiary amine polyether polyols terminated with primary hydroxyl groups, and the "B side" resin component contains no chain extenders or crosslinkers.

5. The composite of claim 4, wherein said hydroxyl functional tertiary amine polyether polyols are selected from the group consisting of monoalkanolamine-initiated polyols, alkylenediamine-initiated polyols, and mixtures thereof.

6. The composite of claim 5, wherein said hydroxyl functional tertiary amine polyether polyols are selected from the group consisting of monoethanolamine-initiated polyols, ethylenediamine-initiated polyols, and mixtures thereof.

7. The composite of claim 3, wherein 50 weight percent to 99 weight percent of the reactive ingredients in the "B side" resin consist of hydroxyl functional tertiary amine polyether polyols.

8. The composite of claim 3, wherein the "B side" resin further contains graft polymer polyether polyol dispersions.

9. The composite of claim 2, wherein the amount of wollastonite is from 10 weight percent to 20 weight percent based on the weight of the composite.

10. The composite of claim 9, wherein the blowing agents consists of water.

11. The composite of claim 9, wherein the wollastonite fibers are acicular, have an aspect ratio of 10 or greater, and are from 0.03 inch to 0.25 inch in length.

12. The composite of claim 2, wherein the flexural modulus of the composite is from 150,000 psi to 210,000 psi at 72° F.

* * * * *